(12) United States Patent
Goel

(10) Patent No.: US 8,327,250 B1
(45) Date of Patent: Dec. 4, 2012

(54) DATA INTEGRITY AND PARITY CONSISTENCY VERIFICATION

(75) Inventor: Atul Goel, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 887 days.

(21) Appl. No.: 12/427,611

(22) Filed: Apr. 21, 2009

(51) Int. Cl.
*G06F 11/00* (2006.01)

(52) U.S. Cl. ........................................................ 714/801

(58) Field of Classification Search .................. 714/801, 714/6.24
See application file for complete search history.

(56) References Cited

U.S. PATENT DOCUMENTS

| | | | |
|---|---|---|---|
| 6,993,701 B2 | 1/2006 | Corbett et al. | |
| 7,073,115 B2 | 7/2006 | English et al. | |
| 7,080,278 B1 | 7/2006 | Kleiman et al. | |
| 7,200,716 B1 * | 4/2007 | Aiello | 711/114 |
| 7,203,892 B2 * | 4/2007 | Corbett et al. | 714/770 |
| 7,346,831 B1 * | 3/2008 | Corbett | 714/770 |
| 7,409,625 B2 | 8/2008 | Corbett et al. | |
| 7,437,652 B2 | 10/2008 | English et al. | |
| 7,519,629 B2 * | 4/2009 | Hafner et al. | 714/6.12 |
| 7,647,526 B1 * | 1/2010 | Taylor | 714/6.32 |
| 2003/0070042 A1 * | 4/2003 | Byrd et al. | 711/114 |
| 2006/0248378 A1 | 11/2006 | Grcanac et al. | |
| 2008/0168225 A1 * | 7/2008 | O'Connor | 711/114 |
| 2009/0055682 A1 * | 2/2009 | Gibson et al. | 714/6 |
| 2009/0172464 A1 * | 7/2009 | Byrne et al. | 714/5 |
| 2009/0285070 A1 * | 11/2009 | Aris | 369/53.21 |

OTHER PUBLICATIONS

Corbett, Peter et al., "Row-Diagonal Parity for Double Disk Failure Correction," Proceeding of the Third USENIX Conference on File Storage Technologies, San Francisco, CA, USA, Mar. 31-Apr. 2, 2004, USENIX Association, 15 pages.

* cited by examiner

*Primary Examiner* — Scott Baderman
*Assistant Examiner* — Yair Leibovich
(74) *Attorney, Agent, or Firm* — Blakely, Sokoloff, Taylor & Zafman LLP

(57) ABSTRACT

Verifying data integrity and parity consistency of data blocks in an array of mass storage devices includes retrieving a row parity algebraic signature and a diagonal parity algebraic signature for one or more data blocks, a row parity block and a diagonal parity block. The row parity algebraic signatures of the one or more data blocks are logically combined to generate a first result and the first result is compared to the retrieved row parity algebraic signature for the row parity block. The diagonal parity algebraic signatures of the one or more data blocks and the row parity block are logically combined to generate a second result and the second result is compared to the retrieved diagonal parity algebraic signature for the diagonal parity block.

19 Claims, 8 Drawing Sheets

| D0 | D1 | D2 | D3 | RP | DP |
|---|---|---|---|---|---|
| $D_{0,4}$ | $D_{0,5}$ | $D_{0,6}$ | $D_{0,7}$ | $P_0$ | $P_4$ |
| $D_{1,5}$ | $D_{1,6}$ | $D_{1,7}$ | $D_{1,8}$ | $P_1$ | $P_5$ |
| $D_{2,6}$ | $D_{2,7}$ | $D_{2,8}$ | $D_{2,4}$ | $P_2$ | $P_6$ |
| $D_{3,7}$ | $D_{3,8}$ | $D_{3,4}$ | $D_{3,5}$ | $P_3$ | $P_7$ |

| | D0 | D1 | D2 | D3 | RP | DP |
|---|---|---|---|---|---|---|
| | $D_{0,4}$ | $D_{0,5}$ | $D_{0,6}$ | $D_{0,7}$ | $P_{0,8}$ | $P_4$ |
| | $D_{1,5}$ | $D_{1,6}$ | $D_{1,7}$ | $D_{1,8}$ | $P_{1,4}$ | $P_5$ |
| | $D_{2,6}$ | $D_{2,7}$ | $D_{2,8}$ | $D_{2,4}$ | $P_{2,5}$ | $P_6$ |
| | $D_{3,7}$ | $D_{3,8}$ | $D_{3,4}$ | $D_{3,5}$ | $P_{3,6}$ | $P_7$ |

Fig. 4

DATA INTEGRITY AND PARITY CONSISTENCY VERIFICATION

RELATED APPLICATIONS

This application is related to the following commonly assigned U.S. patent application Ser. Nos. 10/035,603 filed on Dec. 28, 2001 and now issued as U.S. Pat. No. 7,073,115 on Jul. 4, 2006; 10/035,607 filed on Dec. 28, 2001 and now issued as U.S. Pat. No. 6,993,701 on Jan. 31, 2006; 10/094,086 filed on Mar. 8, 2002 and now issued as U.S. Pat. No. 7,080,278 on Jul. 18, 2006; 11/117,852 filed on Apr. 29, 2005; 11/303,788 filed on Dec. 16, 2005 and now issued as U.S. Pat. No. 7,203,892 on Apr. 10, 2007; 11/402,539 filed on Apr. 12, 2006 and now issued as U.S. Pat. Nos. 7,437,652; and 11/710,304 filed on Feb. 23, 2007 and now issued as U.S. Pat. No. 7,409,625 on Aug. 5, 2008.

TECHNICAL FIELD

This invention relates to the field of data storage systems and, in particular, to verifying data integrity and parity consistency using algebraic signatures.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data minoring), etc.

A network storage system can include at least one storage system, which is a processing system configured to store and retrieve data on behalf of one or more storage client processing systems ("clients"). In the context of NAS, a storage system may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). In a SAN context, the storage server provides clients with block-level access to stored data, rather than file-level access. Some storage servers are capable of providing clients with both file-level access and block-level access.

Almost all RAID arrays employ some form of a parity scrub to verify the integrity of data and parity blocks. A parity scrub works by reading all blocks within a RAID stripe and identifying errors, such as for example, media errors, checksum errors and parity inconsistency. Since blocks are read from a drive and transferred across an interconnect to the controller/head, this scheme taxes both the disk drive as well as the storage network. As a result, parity scrubs are actively throttled and also limited to simultaneous execution on only a few RAID groups to ensure minimal impact to user I/O.

However, as drive capacities have continued to increase, the amount of time it takes to complete a parity scrub on a RAID group is also increasing. For example, if a drive can be scrubbed at 5 megabytes/sec then a 2 terabyte drive will take approximately 110 hours to scrub. For a RAID group size of 16, the interconnect bandwidth that will be consumed for scrubbing 4 RAID groups in parallel will be 320 megabytes/sec, which is almost the bandwidth of a single 4 gigabyte/sec Fibre Channel (FC) loop. At this rate it is only feasible to run scrubs during idle times. For a very large configuration consisting of, for example 500-1000 drives, one complete scan on all drives could end up taking approximately 60 days assuming that scrubs are run as a continuous background process. In reality, some systems may only scrub for approximately 6 hours every week, resuming from the last suspended point. For this configuration, it may take approximately 6-8 months to complete one full scan.

An alternative approach is to scrub all drives simultaneously in the background. To reduce the impact on user I/O, scrubs can be throttled to consume only a small fraction, for example approximately 2% of disk input/output processor (TOP) bandwidth. Although this approach addresses the performance impact on disk I/O bandwidth, simultaneous scrubbing on as few as 200 drives may still end up consuming a loop/interconnect bandwidth of as much as approximately 400 megabytes/sec.

BRIEF DESCRIPTION OF THE DRAWINGS

The present invention is illustrated by way of example, and not by way of limitation, in the figures of the accompanying drawings.

FIG. 4 illustrates a schematic block diagram of one embodiment of a horizontal stripe across a disk array organized in accordance with a RAID-DP scheme.

SUMMARY

Figure 1:
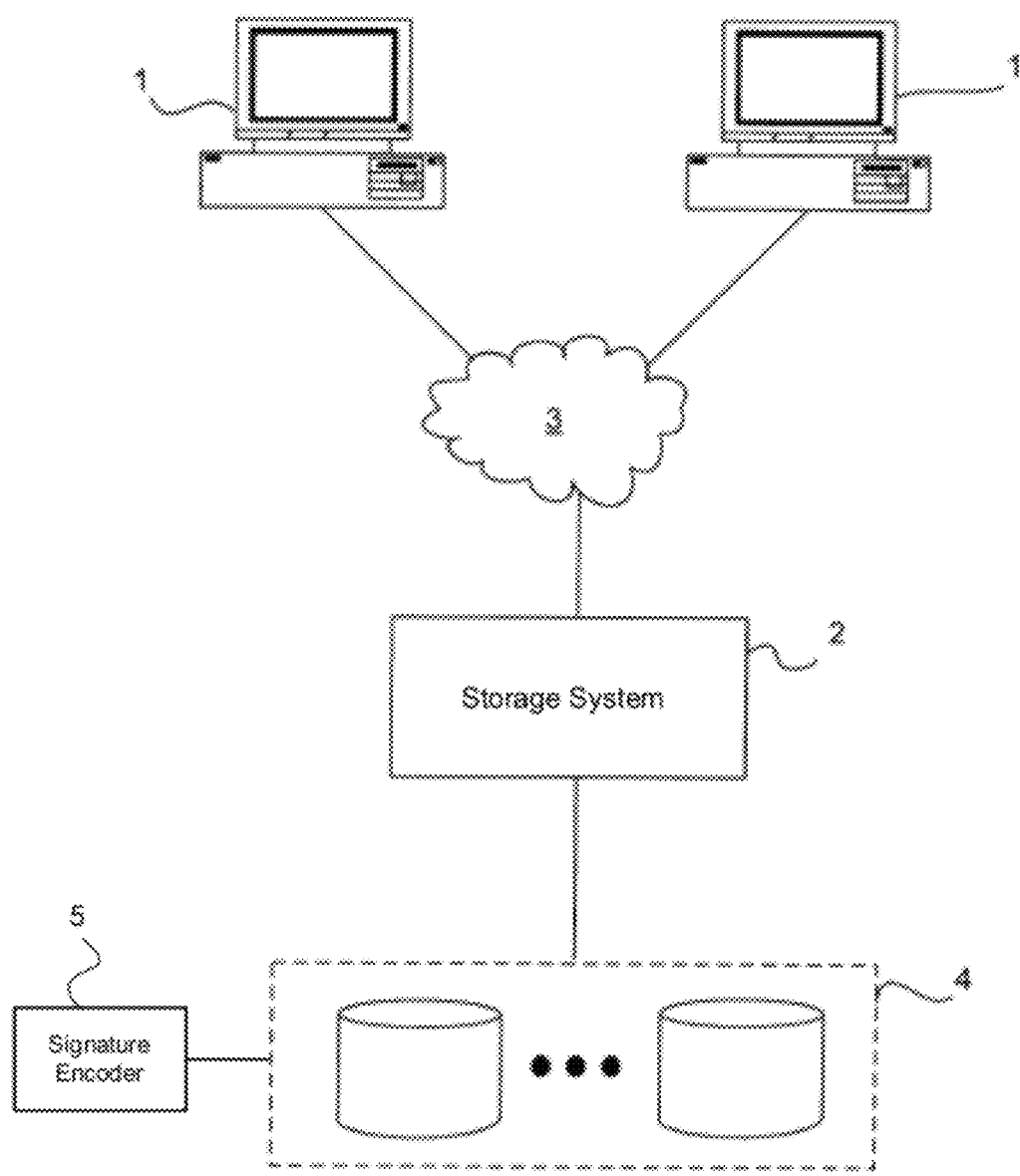
FIG. 1 illustrates a network environment including a storage system according to one embodiment.

Verifying data integrity and parity consistency of data blocks in an array of mass storage devices includes retrieving a row parity algebraic signature and a diagonal parity algebraic signature for one or more data blocks, a row parity block and a diagonal parity block. The row parity algebraic signatures of the one or more data blocks are logically combined to generate a first result and the first result is compared to the retrieved row parity algebraic signature for the row parity block. The diagonal parity algebraic signatures of the one or more data blocks and the row parity block are logically combined to generate a second result and the second result is compared to the retrieved diagonal parity algebraic signature for the diagonal parity block.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described to verify data integrity and parity consistency of data blocks in an array of mass storage devices. In one embodiment, algebraic signatures are used which exhibit the same relationship as the underlying data they represent. Using the algebraic signatures, both the data integrity and parity consistency of the data can be verified by transferring only a fraction of the bytes from the mass storage devices to a storage server where the verification may take place. In one embodiment, where each data block is approximately 4160 bytes, only a 64-byte checksum area and two 8 byte algebraic signatures need to be transferred. This results in a significant savings in loop bandwidth and may allow parity scrubs to be scheduled as a continuous background process.

RAID-DP (diagonal parity) stores data in a parity group of disks by using a redundancy scheme that is capable of reconstructing two or more disks in a redundancy group. As such, RAID-DP is capable of recovering from a simultaneous failure on two disks. One double failure correcting parity scheme is an exclusive-or (XOR)-based scheme that allows a serial reconstruction of lost (failed) disks. According to this parity scheme, all disk blocks belong to two parity sets. The first may be a typical RAID-4 style XOR computed across all the data disks and the second may be computed along a set of diagonally adjacent sub-chunks within each disk block. Each diagonal parity set contains sub-chunks from all but one of the data or row parity disks.

The XOR scheme utilizes a total of n disks, where n−2 disks contain data, with the remaining two disks containing parity information. One of the parity disks contains row parity blocks. Row parity is calculated as the XOR of all the data blocks that are at the same position in each of the data disks. The other parity disk contains diagonal parity blocks. Diagonal parity is constructed from n−2 blocks or sub-chunks that are arranged in a diagonal pattern on the disks.

To enable reconstruction of the disks in the parity scheme, each diagonal parity set contains no information from one of the data or row parity disks. However, there exists one more diagonal than there are blocks or sub-chunks to store the diagonal parity. That is, the parity arrangement results in one additional diagonal that does not have an independent parity sub-chunk. Reconstruction of a lost disk will be described further below.

FIG. 1 shows a simple example of a network environment which incorporates a storage system 2, which can be a file server. Note, however, that the invention is not limited to use in traditional file servers. For example, the invention can be adapted for use in other types of storage systems, such as storage servers which provide clients with block-level access to stored data or processing systems other than storage servers.

The storage system 2 in FIG. 1 is coupled locally to a storage subsystem 4 which includes a set of mass storage devices, and to a set of storage clients 1 (hereinafter simply "clients") through a network 3, which may be a local area network (LAN), a wide area network (WAN), a global area network (GAN) such as the Internet, or a combination of such networks. Each of the clients 1 may be, for example, a conventional personal computer (PC), workstation, or the like. The storage subsystem 4 is managed by the storage system 2. The storage system 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. Signature encoder 5 is coupled to storage subsystem 4. In one embodiment, signature encoder 5 computes algebraic signatures for the data stored in storage subsystem 4. Signature encoder 5 will be described further below. In an alternative embodiment, algebraic signatures are computed directly in storage subsystem 4.

The storage system 2 may have a distributed architecture; for example, it may include a separate N- ("network") blade and D- (disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage system 2 may have an integrated architecture, where the network and data components are all contained in a single box. The storage system 2 further may be coupled through a switching fabric to other similar storage systems (not shown) which have their own local storage subsystems. In this way, all of the storage subsystems can form a single storage pool, to which any client of any of the storage systems has access.

Figure 2A:
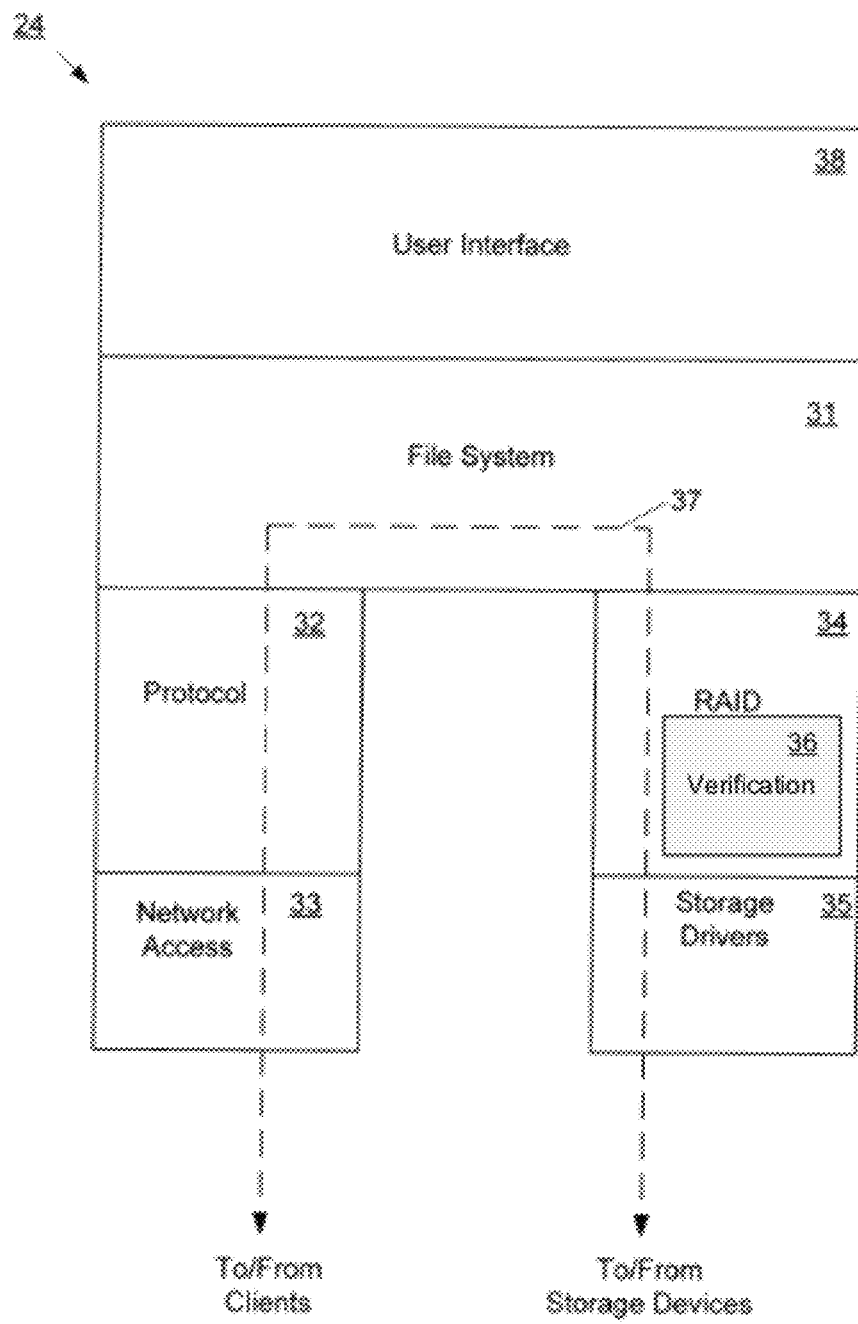
FIG. 2a illustrates one embodiment of the architecture of the operating system of the storage system.

FIG. 2a shows an example of the operating system 24 of the storage system 2. As shown, the operating system 24 includes several modules, or "layers". These layers include a file system 31. The file system 31 is software, executed by a processor, that imposes a hierarchy (e.g., a directory/file structure) on the data stored in the storage subsystem 4 and manages read/write operations on the data (i.e., executes read/write operations on the disks in response to client requests). The operating system 24 also includes a protocol layer 32 and an associated network access layer 33, to allow the storage system 2 to communicate over the network 3 (e.g., with clients 1). The protocol 32 layer implements a number of higher-level network protocols, such as Network File System (NFS), Common Internet File System (CIFS), Hypertext Transfer Protocol (HTTP) and/or Transmission Control Protocol/Internet Protocol (TCP/IP). The network access layer 33 includes one or more drivers which implement one or more lower-level protocols to communicate over the network, such as Ethernet or Fibre Channel.

The operating system 24 also includes a storage access layer 34 and an associated storage driver layer 35, to allow the storage system 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-4, RAID-5 or RAID-DP, and therefore it is alternatively called the "RAID layer" 34.

Also shown in FIG. 2a is the path 37 of data flow, through the operating system 24, associated with a read or write operation. The operating system 24 also includes a user interface 38 to generate a command line interface (CLI) and/or graphical user interface (GUI), to allow administrative control and configuration of the storage system 2, from a local or remote terminal.

For purposes of this description, it is assumed that the RAID layer 34 implements RAID-DP, as described further below. As shown in FIG. 2a, in one embodiment of the invention the RAID layer 34 includes a verification module 36, which implements the data integrity and parity consistency verification scheme being introduced here, as further described below.

Figure 2B:
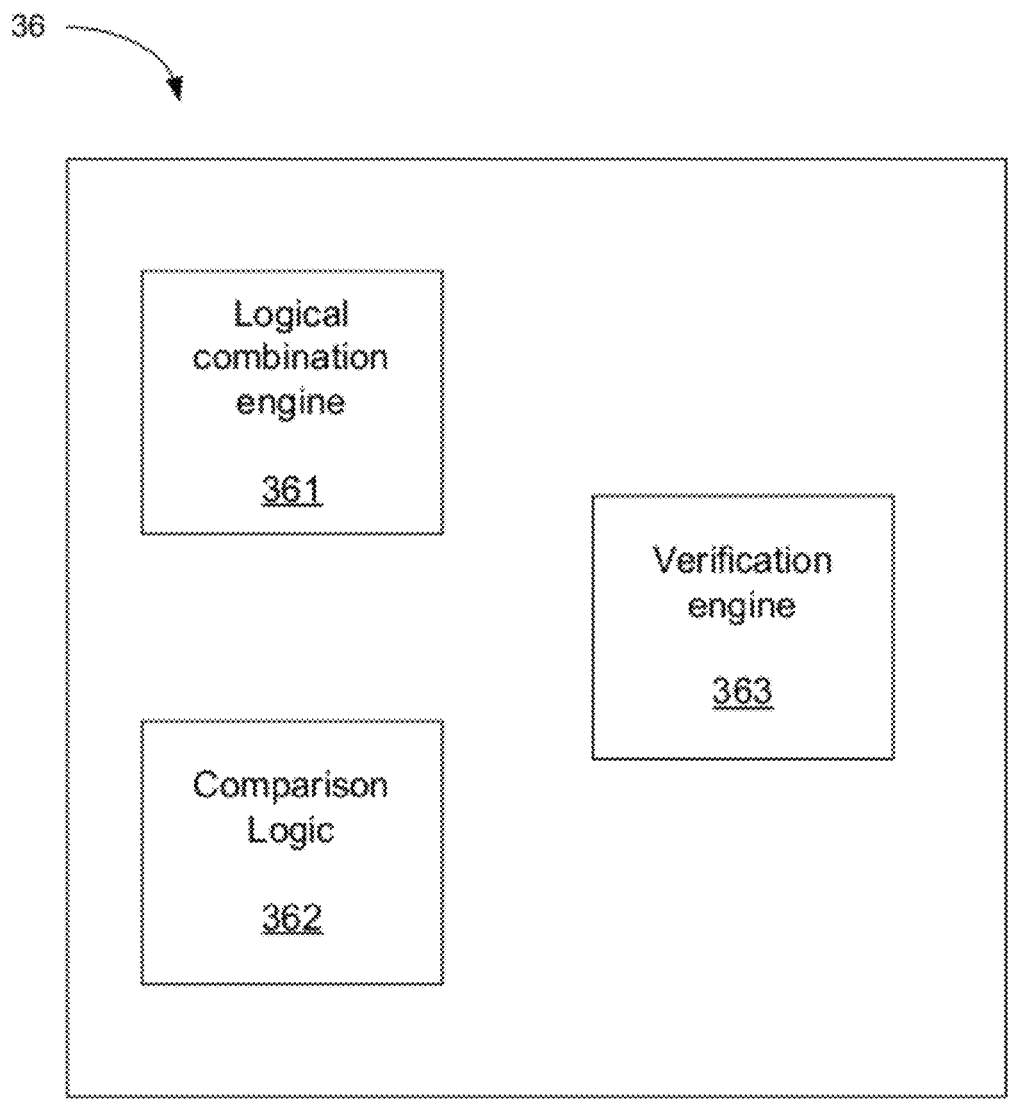
FIG. 2b illustrates one embodiment of the verification module.

FIG. 2b illustrates one embodiment of verification module 36. In this embodiment, verification module 36 includes logical combination engine 361, comparison logic 362 and verification engine 363. The function of verification module 36, according to one embodiment, will be described further below with respect to FIG. 5.

It will be appreciated that certain embodiments of the present invention may be implemented with sold-state memories including flash storage devices constituting storage subsystem 4. For example, verification module 36 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which are illustratively 4 kB in size, although other page sizes (e.g., 2 kB) may also be advantageously used with the present invention.

Illustratively, a plurality of flash devices may be arranged as one or more parity groups, and RAID layer 34 may manage parity computations and layout information used for storage of data on the devices of each group. To that end, in one embodiment, RAID layer 34 further organizes the data as stripes of blocks within the parity groups, wherein a stripe may constitute similarly located flash pages across the flash devices. That is, a stripe may span a first page 0 on flash device 0, a second page 0 on flash device 1, etc. across the entire parity group with parity being distributed among the pages of the devices.

Figures 3A, 3B:
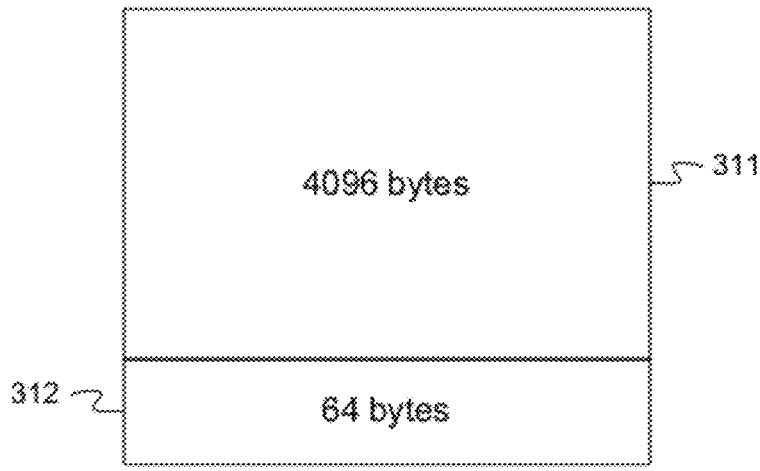
FIG. 3a illustrates a schematic block diagram of one embodiment of a disk array.
FIG. 3b illustrates a schematic block diagram of one embodiment of a data block.

FIG. 3a illustrates a schematic block diagram of one embodiment of a disk array 300. Each disk (D0, D1, D2, D3, RP, DP) comprises one or more data blocks which are divided into a number of sub-chunks. Each sub-chunk $D_{a,b}$ belongs to parity sets a and b, where the parity sub-chunk for each parity set is denoted $P_c$. In one embodiment, parity set a is a row parity set and parity set b is a diagonal parity set. Note that for one diagonal ($P_8$), there is no corresponding parity sub-chunk stored. In order to allow reconstruction from two disk failures, each data disk does not contribute to at least one of the diagonal parity sets. As discussed above, row parity may be calculated as the XOR of all the data sub-chunks that are at the same position in each of the data disks. Equation 1 illustrates the computation of row parity in one embodiment.

$$D_{0,4} \oplus D_{0,5} \oplus D_{0,6} \oplus D_{0,7} = P_0 \qquad (1)$$

FIG. 3b illustrates a schematic block diagram of one embodiment of a data block 310. Data block 310 may be one data block from one disk of a disk array such as disk array 300. Data block 310 includes data 311 and checksum area 312. In one embodiment, data 311 occupies 4096 bytes and checksum area 312 occupies 64 bytes. In alternative embodiments, data 311 and checksum area 312 may have other sizes. Checksum area 312 may include, for example, a checksum, flags, lost write information, and/or other information. The checksum of data 311 and checksum area 312 may be computed by applying one of any number of conventional checksum functions. Checksum functions are well known to one skilled in the art and therefore, detailed information regarding checksum functions is omitted so as not to obscure the present invention. In one embodiment, the data block 311 is divided into a number of sub-chunks as illustrated in FIG. 3a. For example, the 4096 byte block may be divided into 256 16-byte sub-chunks.

In one embodiment, two algebraic signatures are computed based on the 4096 bytes of data. A Row-Parity signature is used with the corresponding Row-Parity information and a Diagonal-Parity signature is used with the corresponding Diagonal-Parity information. In one embodiment, the two algebraic signatures are the same signature, but this is not required. The algebraic signatures are functions which may be applied to the data, such as data 311 of FIG. 3b, such that within a stripe, the signature of the row parity block must be the same as the XOR of the signatures of the data blocks. Thus, the algebraic signature for row parity must satisfy Equation 2, where s(y) symbolizes the signature function s applied to data y and (D0,0) refers to a block on disk D0 at offset 0, (D1,0) refers to a block on disk D1 at offset 0, etc.

$$s(D0,0) \oplus s(D1,0) \oplus s(D2,0) \oplus s(D3,0) = s(RP,0) \qquad (2)$$

There are many algorithms for computing algebraic signatures which satisfy the property of Equation 2 for RAID-4 and RAID-5 type XOR schemes. These algebraic signatures are well known to one skilled in the art and therefore, detailed information regarding the algorithms used to compute the algebraic signatures is omitted so as not to obscure the present invention.

The property illustrated in Equation 2 and described above does not apply to Diagonal-Parity. However, by rearranging sub-chunks within each block, algebraic signatures for Diagonal-Parity can be computed in a manner which can allow a storage system to verify diagonal parity consistency as well as row parity consistency.

FIG. 4 illustrates a schematic block diagram of one embodiment of a horizontal stripe 400 of a disk array organized in accordance with a RAID-DP scheme. Stripe 400 is a logical construct of data blocks across a number of disks in the disk array. The data in stripe 400 is not necessarily physically located in a stripe, but the blocks in a stripe are arranged at the same offset from the start of each disk. Assume n equals the number of disks in the array. The first n−2 disks (D0-D3) hold data, while disk n−1 (RP) holds row parity for the data disks D0-D3 and disk n (DP) holds diagonal parity. In the illustrated embodiment, the number of disks n in the array equals six, however, the number of disks may be more or less than six, so n may equal a different number. In one embodiment of a RAID-DP implementation, a stripe includes a single row of blocks. In this scheme, each block is logically divided into n−2 sub-chunks. Diagonals are created across sub-chunks from different blocks within a stripe.

The data sub-chunks and the row parity sub-chunks in FIG. 4 are numbered such that each sub-chunk belongs to a diagonal parity set and, within each row, each sub-chunk belongs to a different diagonal parity set. The notation $D_{a,b}$ denotes that those data sub-chunks belong to the row and diagonal used for purposes of computing row parity (a) and diagonal parity (b), and $P_{a,b}$ stores the parity for row parity set (a) and also contributes to diagonal parity set (b). The notation also includes the row parity sub-chunk used for purposes of computing the diagonal parity for a particular diagonal. One example of computed diagonal parity is shown in Equation 3.

$$D_{0,4} \oplus D_{3,4} \oplus D_{2,4} \oplus P_{1,4} = P_4 \qquad (3)$$

Note that each of the diagonal parity sub-chunks stored on the diagonal parity disk contain contributions from all but one of the other disks (including the row parity disk) of the array. For example, the diagonal parity sub-chunk $P_4$ has contributions from D0 ($D_{0,4}$), D2 ($D_{3,4}$), D3 ($D_{2,4}$) and RP ($P_{1,4}$), but no contribution from D1. Note also that the diagonal parity for diagonal 8 ($P_8$) is neither computed nor is it stored on the diagonal parity disk DP.

According to the RAID-DP scheme, the diagonal parity sub-chunks on disk DP include the row parity sub-chunks in their XOR computation. In other words, the diagonal parity stored on the disk DP is computed in accordance with the contents of the data disks and with the contents of the row parity disk. By encoding the diagonal parity sub-chunks as shown in array 400, the system can recover from any two concurrent disk failures despite the missing diagonal parity ($P_8$). The fact that the row parity sub-chunks are factored into the computations of the diagonal parity sub-chunks stored on the diagonal parity disk DP, allows recovery from the failure of two disks as described below.

Operationally, if the diagonal parity disk DP and any data disk are lost, recovery is achieved by first rebuilding the data disk from row parity (e.g., in accordance with a conventional RAID-4 reconstruction technique) and then rebuilding the diagonal parity disk. Similarly, if the two parity disks are lost, recovery is achieved by first rebuilding the row parity disk RP from the data disks and then rebuilding the diagonal parity disk DP. On the other hand, losing any pair of data disks allows immediate recovery of one sub-chunk from at least one and possibly two of the diagonal parity sets. From there, the system is able to recover the rest of the missing data sub-chunks. Notably, losing the row parity disk RP and a data disk is exactly the same as losing two data disks, and recovery may be achieved in the same manner. In alternative embodiments, other XOR based fault tolerant algorithms may be used, such as for example, EVENODD or RAID-TP (RAID triple parity).

In order to apply algebraic signatures to a RAID-DP system, such as the one described above, sub-chunks of the disks are rearranged. For each block, an offset by which the contents of the block must be circularly shifted is specified. The sub-chunks are re-arranged corresponding to each diagonal in increasing order of diagonal numbers. In one embodiment, the sub-chunk size is 16-bytes, however in alternative embodiments other sub-chunk sizes are used. Since the total number of diagonals exceeds the number of sub-chunks in a block by one, an extra sub-chunk may be required, (i.e. the 4096 byte block is transformed to a 4096+16=4112 byte block). This is accomplished by adding a zeroed sub-chunk at the end of the block before doing the rearrangement.

The offset of a sub-chunk corresponding to a given diagonal may be different for different drives. Hence, the rearrangement done for a given block will depend on the layout of diagonals on that block. Given the shifting offset, a simple circular shift of bytes within a block will be able to accomplish this rearrangement. In one embodiment where the component computing the algebraic signature has knowledge about the dropped diagonal, the sub-chunk corresponding to the dropped diagonal is simply ignored and the remaining sub-chunks are further shifted to retransform the 4096+16=4112-byte block back to a 4096-byte block.

After a block has been rearranged such that sub-chunks corresponding to a diagonal number are located at the same offset from the start of the block, the algebraic signature can be computed using the same algorithm as that used for generating signatures for RAID-4 or RAID-5 type XOR scheme discussed above. Equation 4 shows the calculation of diagonal parity $P_4$ where s(y') symbolizes the signature function s applied to circularly shifted data y' and (D0,0') refers to a block on disk D0 at offset 0 after it has been circularly shifted, etc.

$$s(D0,0') \oplus s(D1,0') \oplus s(D2,0') \oplus s(D3,0') \oplus s(RP,0') = s(DP,0') \quad (4)$$

Any algorithm may be used for computing the algebraic signature so long as the algorithm is identical across all drives present in a RAID stripe. In one embodiment, when writing to a block, RAID computes both a row parity signature and a diagonal parity signature and stores the signatures within the checksum area of each block. The diagonal parity signature of a block is computed by rearranging the sub-chunks in the block such that a sub-chunk corresponding to a given diagonal falls at a fixed offset for all blocks within a stripe. In an alternative embodiment, where the computed signatures are not stored within the checksum area, the identical property of the algorithm holds only for a given instance of a scrub and for a particular stripe. Thus, different algorithms may be used for different stripes.

When reading a block for verifying the consistency of a stripe, the algebraic signatures are recomputed for the blocks and are transferred along with the checksum area to the initiator. For each 4160-byte block read, the signature computing component, which may include a combination of hardware and software executed by a processor, returns two algebraic signatures of 8-bytes each and the 64-byte checksum information. This results in a significantly smaller amount of data transfer when compared to schemes where the entire 4160-byte block has to be transferred. The algebraic-signatures and the 64-byte checksums for multiple sequential blocks can be batched together when the minimum unit of data transfer between the initiator and the drive is greater than the above data.

The above mentioned algebraic signatures can be computed at various locations when reading blocks for verifying data integrity and parity consistency. In one embodiment, the algebraic signatures are computed at a mass storage device, such as a disk drive. Computing signatures within a drive ensures maximum scrub efficiency since it implies minimal loop bandwidth usage. In an alternative embodiment, the algebraic signatures are computed at a dongle attached to a drive. A dongle may include a small hardware component attached to the drive interface and generally used for protocol translation. Computing signatures within a dongle provides almost the same advantages as computing them on the drive. In another alternative embodiment, the algebraic signatures are computed at a shelf controller. Computing signatures within a shelf controller helps reduce the front-end loop bandwidth. However, it still consumes bandwidth between the shelf and disks. Configurations where the back-end bandwidth is greater than the front-end bandwidth can benefit by performing the computation within a shelf. In yet another alternative embodiment, the algebraic signatures are computed at an adapter. Assuming that available processing power exists, computing signatures within an adapter may help save PCI bandwidth. In other alternative embodiments, the algebraic signatures may be computed at other locations. In an embodiment where algebraic signatures are computed when writing to a data block, the algebraic signatures may be computed in the storage system, such as storage system 2 of FIG. 1. By computing the algebraic signatures in the storage system, any potential corruptions which might manifest along the I/O path (including the PCI bus, adapters, interconnect/loops, drive memory, etc.) can be detected.

Figure 5:
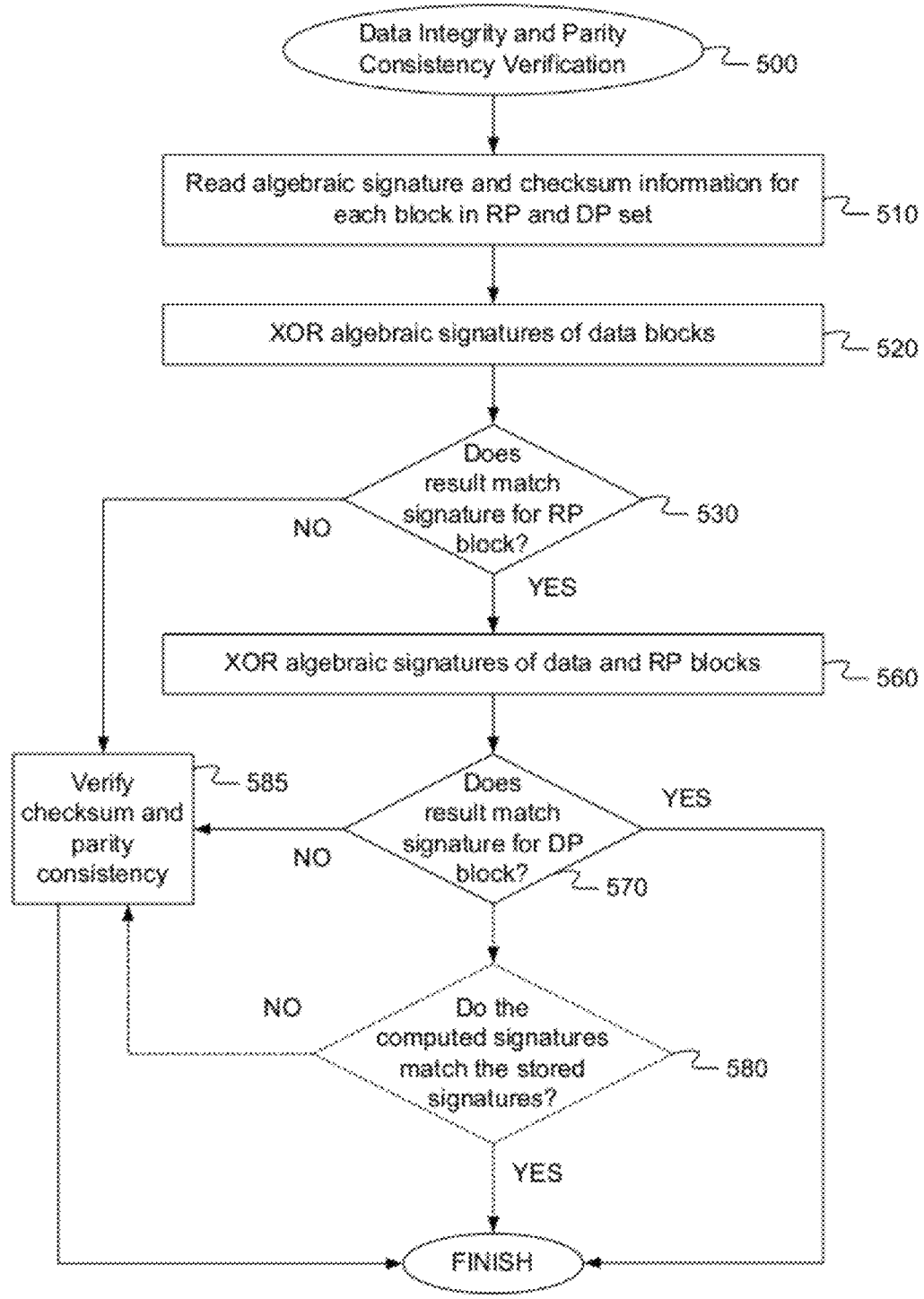
FIG. 5 illustrates a flow diagram of one embodiment of a data integrity and parity consistency verification process.

Upon receiving the 64-byte checksum and 2 algebraic signatures, a storage system verifies data integrity and parity consistency as illustrated in FIG. 5. The process 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, process 500 is performed by storage system 2 of FIG. 1. In one embodiment, at block 510, process 500 reads algebraic signatures and checksum information for a plurality of blocks in a row parity set and a diagonal parity set. The algebraic signatures may be computed at an external signature encoder device, as discussed above. The row parity set may include one data block from each disk in a disk array such as storage subsystem 4 of FIG. 1 arranged in a horizontal stripe. The row parity set may include one or more data blocks and one row parity (RP) block. The diagonal parity set may include one block from each of the data drives in the array, one row parity block and one diagonal parity (DP) block. In one embodiment, the storage system sends a read command to the mass storage device to retrieve the algebraic signatures and the checksum area. At block 520, process 500 logically combines the algebraic signatures of the data blocks in the row parity set to generate a result. In one embodiment, the logical combination includes applying an XOR function to the algebraic signatures of the blocks. In one embodiment, the logical combination is performed by logical combination engine 361, as shown in FIG. 2b. At block 530, process 500 compares the result of the logical combination with the algebraic signature for the row parity block. If the result of the logical combination matches the algebraic signature for the row parity block, process 500 continues at block 560. If the result at block 530 is a mismatch, process 500 proceeds to block 585, which is described below. In one embodiment, the comparison is performed by comparison logic 362 as shown in FIG. 2b.

At block 560, process 500 logically combines the algebraic signatures of the data blocks and the row parity block of the diagonal parity set to generate a result. In one embodiment, the logical combination includes applying an XOR function to the algebraic signatures of the blocks. In one embodiment, the logical combination is performed by logical combination engine 361, as shown in FIG. 2b. At block 570, process 500 compares the result of the logical combination with the signature for the diagonal parity block. If the result of the logical combination matches the algebraic signature for the diagonal parity block, process 500 ends. If the result at block 570 is a mismatch, process 500 proceeds to block 585, which is described below. In one embodiment, the comparison is performed by comparison logic 362 as shown in FIG. 2b.

If the result at block 530 or 570 is a mismatch, it implies either bad data or bad parity and the storage server reverts to reading the entire contents of a stripe to explicitly verify checksum and parity consistency. At block 585, process 500 reads the entire block, rather than the smaller algebraic signature, and re-computes the checksum for the block to verify the data integrity If however, the signatures match at blocks 530 and 570, then further checks are made to ascertain the correctness of Write Anywhere File Layout (WAFL)-context and RAID lost-write information. These checks are based on the contents of the 64-byte checksum area and are identical to those used by a conventional scrubbing mechanism for verifying data integrity and parity consistency. The section below explains the rationale behind the correctness of the verification process for ascertaining that the required consistency/integrity variants are met.

In an alternative embodiment which occurs during a write operation, process 500 is performed by processing element located within a storage server, such as storage server 2 of FIG. 1. In this embodiment, the steps are the same except that for each block to be written to the mass storage subsystem, the algebraic signature is stored in the checksum area. Once it is determined that the calculated signatures match process 500 optionally proceeds to block 580. At block 580, process 500 compares the row-parity signature and the diagonal-parity signature for each block to the corresponding signatures stored within the checksum area of the row-parity block and the diagonal-parity block, respectively. In one embodiment, the step at block 580 is performed by verification engine 363 as shown in FIG. 2b. In alternative embodiments, the computed signature is compared to a corresponding signature stored within the checksum area of the drive for all blocks in the set (i.e., all data blocks as well as the row-parity and diagonal parity blocks). If the comparison results in a mismatch, process 500 proceeds to block 585 and if the comparison results in a match, process 500 ends.

The objective of data integrity verification is to ascertain if the integrity of the data and/or parity might have been compromised as a result of errors or faults while the data was either written or read. Since any modification to the original set of bits would result in a different algebraic signature, the XOR scheme described above will detect this either as a row-parity mismatch or a diagonal-parity mismatch.

The probability of the XOR scheme being accurate depends upon the probability of a signature collision occurring as a result of data transformation due to bit-errors. This probability is assumed to be very low (almost zero) since the fundamental premise behind signature verification during user reads is based on the same assumption.

The objective of parity consistency verification is to check if the row and diagonal parity for data blocks matches the row and diagonal parity values stored on the parity disks. Since algebraic signatures exhibit the same relationship as their parent data, data integrity and parity consistency verification ensure that matching XORs for signatures imply that XORs for the data blocks should also match.

WAFL context information for lost write protection is contained within the 64-byte checksum area. Since this area is read in its entirety, context verification process remains unchanged. RAID specific lost-write context information is also contained within the 64-byte checksum area, thus, the context verification process remains unchanged.

Mutual consistency is verified at block 580, where process 500 verifies that the computed algebraic signature for the data block is indeed the same as the algebraic signature stored within the checksum-area of the block. Although the integrity of the data has already been verified, mutual consistency ensures that a subsequent read for the data will not be treated as a checksum error (unless an error develops later).

In an alternative embodiment, mutual consistency is verified in a manner eliminating the need to store signatures within the checksum area. The above scheme requires RAID to compute and store the algebraic signature within the checksum area when writing to a block. This not only constrains RAID checksums to be based on algebraic signatures but also imposes the restriction that the same algebraic signature algorithm should be used when reading a stripe for consistency verification. Eliminating the need to store these signatures can result in significant flexibility. For example, RAID checksums could adopt a different algorithm (e.g., Adler-32). In addition, the signature computation algorithm could be altered, without impacting the verification process, as long as the same algorithm is used for blocks read from all disks within a stripe.

Simply verifying a data integrity variant is not sufficient to ensure mutual consistency since the checksum area could be stored in a different sector (it is possible that an update to it was lost while data sectors were successfully written). In particular, if the last write did not result in a modification of the WAFL context information, then a stripe integrity variant would also fail to capture the checksum mismatch. There are two possible alternatives by which mutual consistency can be implicitly verified.

First, RAID context verification relies on updating a generation ID every time a block is modified. The generation ID is matched against another copy stored within the parity disks. As a result, a missed update to the checksum area on one disk results in a generation ID mismatch causing the RAID context integrity check to fail. As a result, the mutual consistency failure is caught as a RAID context check failure.

Second, checksums are stored within the parity protected region of the checksum area. If the checksum for either the data or parity region fail to get updated due to a torn/lost sector, then the stripe integrity check fails.

Both of the above approaches are still exposed to the pathological case where checksum area updates for both data as well as parity disks are lost or torn. However, the probability for this happening on multiple disks is very low.

Figure 6:
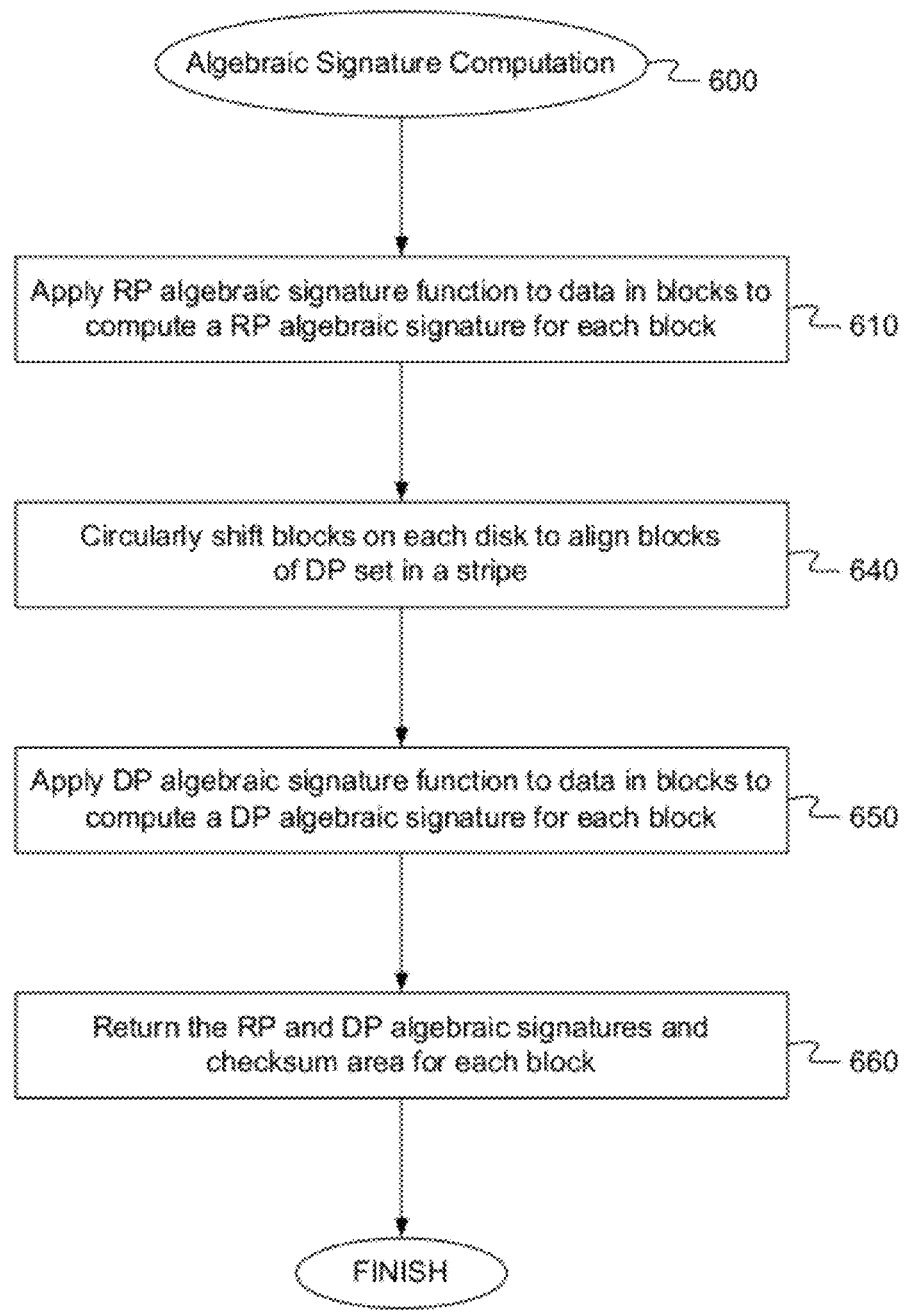
FIG. 6 illustrates a flow diagram of one embodiment of a algebraic signature computation process.

FIG. 6 illustrates a flow diagram of one embodiment of a algebraic signature computation process. The process 600 may be performed by processing logic that comprises hardware (e.g., circuitry, dedicated logic, programmable logic, microcode, etc.), software (e.g., instructions run on a processing device to perform hardware simulation), or a combination thereof. In one embodiment, process 600 is performed by signature encoder 5 of FIG. 1. In one embodiment, at block 610, process 600 applies the row parity algebraic signature function to data in the blocks of a row parity set to compute an algebraic signature for each block in the set. At block 640, process 600 circularly shifts the sub-chunks in the blocks of each drive in the array, as described above, such that the sub-chunks of a diagonal parity set are aligned in a horizontal stripe across the drives. At block 650, process 600 applies the diagonal parity algebraic signature to each block in the diagonal parity set to compute an algebraic signature for each block. The shifted blocks may include one data block from each data drive as well as a row parity block from the row parity drive and a diagonal parity block from the diagonal parity drive. At block 660, process 600 returns the row parity algebraic signature and the diagonal parity algebraic signature for each block along with the checksum area for each block to the requestor (e.g., storage server 2). After the algebraic signatures are returned, process 600 ends.

Figure 7:
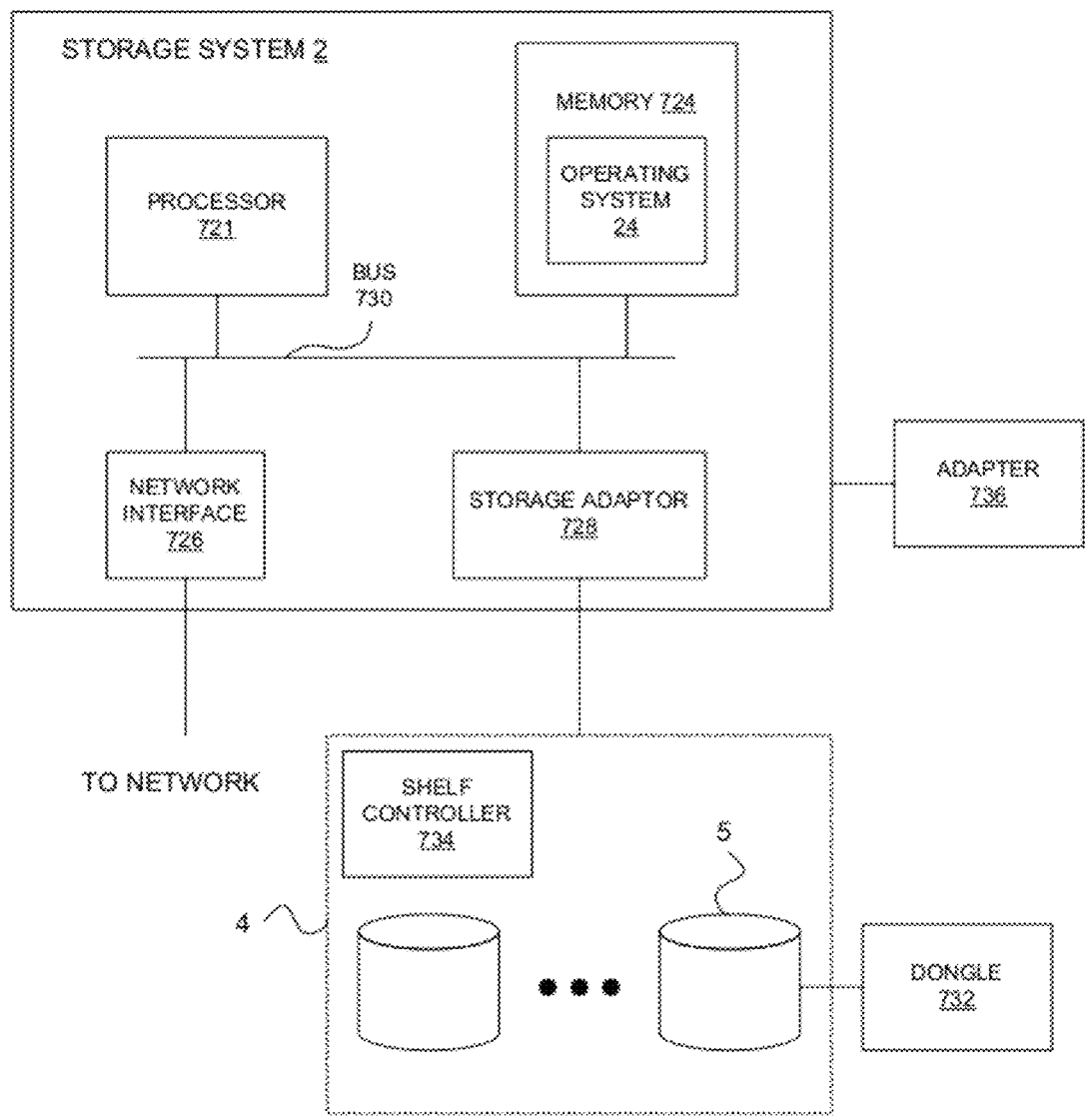
FIG. 7 illustrates a block diagram of one embodiment of the hardware architecture of a storage system.

FIG. 7 illustrates a schematic block diagram of one embodiment of a storage system 2 which may implement the above-described schemes, according to certain embodiments of the invention. Referring to FIG. 7, in this embodiment, the storage system 2 includes a processor 721, a memory 724, a network interface 726, and a storage adaptor 728, which are coupled to each other via a bus system 730. The bus system 730 may include one or more busses and/or interconnects. The storage system 2 communicates with a network via the network interface 726, which may be an Ethernet adaptor, fiber channel adaptor, etc. The network interface 726 may be coupled to a public network, a private network, or a combination of both in order to communicate with a client machine usable by an administrator of the remote data storage system.

In one embodiment, the processor 721 reads instructions from the memory 724 and executes the instructions. The memory 724 may include any of various types of memory devices, such as, for example, random access memory (RAM), read-only memory (ROM), flash memory, one or more mass storage devices (e.g., disks), etc. The memory 724 stores instructions of an operating system 24. The processor 721 retrieves the instructions from the memory 724 to run the operating system 24. The storage system 2 interfaces with one or more storage systems via the storage adaptor 728, which may include a small computer system interface (SCSI) adaptor, fiber channel adaptor, etc.

Also coupled to storage system 2 may be storage subsystem 4. A signature encoder such as dongle 732, shelf controller 734, or adapter 736 may also be included. In certain embodiments one or more signature encoders may be coupled to storage system 2. The signature encoder may be used to compute the algebraic signatures when reading blocks for checking data integrity and parity consistency. In one embodiment, shelf controller 734 is implemented within storage subsystem 4 and dongle 732 is coupled directly to one of the mass storage devices 5 in storage subsystem 4.

The description above sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

Embodiments of the present invention include various operations, which were described above. These operations may be performed by hardware components, software executed by a processor, firmware, or a combination thereof.

Certain embodiments may be implemented as a computer program product that may include instructions stored on a computer-readable storage medium. These instructions may be used to program a general-purpose or special-purpose processor to perform the described operations. A computer-readable storage medium includes any mechanism for storing or transmitting information in a form (e.g., software executed by a processor, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical; or another type of medium suitable for storing electronic instructions.

Additionally, some embodiments may be practiced in distributed computing environments where the machine-readable medium is stored on and/or executed by more than one computer system. Alternatively, the storage system may have an integrated architecture, where the network and data components are all contained in a single box. The storage system further may be coupled through a switching fabric to other similar storage systems which have their own local storage subsystems. In this way, all of the storage subsystems can form a single storage pool, to which any client of any of the storage systems has access. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
    retrieving, by a storage server, a row parity algebraic signature and a diagonal parity algebraic signature for each of: one or more data blocks, a row parity block and a diagonal parity block;
    logically combining the row parity algebraic signatures of the one or more data blocks to generate a first result;
    comparing the first result to the retrieved row parity algebraic signature for the row parity block;
    aligning a plurality of sub-chunks of the one or more data blocks, the row parity block and the diagonal parity block in a stripe across a plurality of mass storage devices, and circularly shifting the sub-chunks such that sub-chunks corresponding to a diagonal parity set are located at a same offset from a start of their block;
    logically combining the diagonal parity algebraic signatures of the one or more data blocks and the row parity block to generate a second result;
    comparing the second result to the retrieved diagonal parity algebraic signature for the diagonal parity block; and
    verifying data integrity and parity consistency for data in the one or more data blocks, row parity block and diagonal parity block if the first result matches the row parity algebraic signature and the second result matches the diagonal parity algebraic signature.

2. The method of claim 1, further comprising:
    computing the row parity algebraic signature for the one or more data blocks and the row parity block.

3. The method of claim 2, wherein computing the row parity algebraic signature comprises applying a row parity algebraic signature function to data in each block.

4. The method of claim 1, further comprising:
    computing the diagonal parity algebraic signature torr the one or more data blocks, the row parity block and the diagonal parity block.

5. The method of claim 4, wherein computing the diagonal parity algebraic signature comprises applying a diagonal parity algebraic signature function to data in each block.

6. The method of claim 1, wherein logically combining the algebraic signatures comprises applying an exclusive-or (XOR) function to the algebraic signatures.

7. The method of claim 1, further comprising:
    comparing the algebraic signatures for each block with corresponding algebraic signatures stored within a checksum area of each block.

8. A system comprising:
    an array of mass storage devices;
    a signature encoder, coupled to the array of mass storage devices, and configured to:
        compute a row parity algebraic signature for one or more data blocks and a row parity block;
        compute a diagonal parity algebraic signature for the one or more data blocks, the row parity block and a diagonal parity block, wherein computing the diagonal parity algebraic signature comprises aligning a plurality of sub-chunks of the one or more data blocks, the row parity block and the diagonal parity block in a stripe across a plurality of mass storage devices, and circularly shifting the sub-chunks such that sub-chunks corresponding to a diagonal parity set are located at a same offset from a start of their block; and
    a storage server, coupled to the array of mass storage devices, and configured to:
        retrieve the row parity algebraic signature and the diagonal parity algebraic signature for the one or more data blocks, the row parity block and the diagonal parity block;
        logically combine the row parity algebraic signatures of the one or more data blocks to generate a first result;
        compare the first result to the retrieved row parity algebraic signature for the row parity block;
        logically combine the diagonal parity algebraic signatures of the one or more data blocks and the row parity block to generate a second result;
        compare the second result to the retrieved diagonal parity algebraic signature for the diagonal parity block; and
        verify data integrity and parity consistency for data in the one or more data blocks, row parity block and diagonal parity block if the first result matches the row parity algebraic signature and the second result matches the diagonal parity algebraic signature.

9. The system of claim 8, wherein computing the row parity algebraic signature comprises applying a row parity algebraic signature function to data in each block.

10. The system of claim 8, wherein computing the diagonal parity algebraic signature comprises applying a diagonal parity algebraic signature function to data in each block.

11. The system of claim 8, wherein logically combining the algebraic signatures comprises applying an exclusive-or (XOR) function to the algebraic signatures.

12. The system of claim 8, wherein the storage server is further configured to compare the algebraic signatures for each block with corresponding algebraic signatures stored within a checksum area of each block.

13. The system of claim 8, wherein the signature encoder comprises a dongle.

14. The system of claim 8, herein the signature encoder comprises a shelf controller.

15. A storage server comprising:
    a processor unit; and
    a memory, coupled to the processor unit, storing instructions which, when executed by the processor unit, cause the system to:
        retrieve a row parity algebraic signature and a diagonal parity algebraic signature for one or more data blocks, a row parity block and a diagonal parity block;

logically combine the row parity algebraic signatures of the one or more data blocks to generate a first result;

compare the first result to the retrieved row parity algebraic signature for the row parity block;

align a plurality of sub-chunks of the one or more data blocks, the row parity block and the diagonal parity block in a stripe across a plurality of mass storage devices, wherein aligning the plurality of sub-chunks comprises circularly shifting the sub-chunks such that sub-chunks corresponding to a diagonal parity set are located at a same offset from a start of their block;

logically combine the diagonal panty algebraic signatures of the one or more data blocks and the row parity block to generate a second result;

compare the second result to the retrieved diagonal parity algebraic signature for the diagonal parity block; and verify data integrity and parity consistency for data in the one or more data blocks, row parity block and diagonal parity block if the first result matches the row parity algebraic signature and the second result matches the diagonal parity algebraic signature.

16. The storage server of claim 15, wherein logically combining the algebraic signatures comprises applying an exclusive-or (XOR) function to the algebraic signatures.

17. A method comprising:

computing, by a signature encoder, a row parity algebraic signature;

computing, by the signature encoder, a diagonal parity algebraic signature for a data block in a mass storage array, wherein the computing the diagonal parity algebraic signature comprises aligning a plurality of sub-chunks of one or more data blocks, a row parity block and a diagonal parity block in a stripe across a plurality of mass storage devices, and circularly shifting the sub-chunks such that sub-chunks corresponding to a diagonal parity set are located at a same offset from a start of their block;

sending the row parity algebraic signature and the diagonal parity algebraic signature to a storage server; and verifying data integrity and parity consistency of the data block using the row parity algebraic signature and the diagonal parity algebraic signature.

18. The method of claim 17, wherein verifying data integrity and parity consistency comprises:

logically combining the row parity algebraic signature with row parity algebraic signatures of one or more other data blocks to generate a first result;

comparing the first result to a row parity algebraic signature for a row parity block;

logically combining the diagonal parity algebraic signature with diagonal parity algebraic signatures of the one or more other data blocks and the row parity block to generate a second result; and comparing the second result to a diagonal parity algebraic signature for the diagonal parity block.

19. The method of claim 17, further comprising:

determining that the data integrity and parity consistency are valid if the first result matches the row parity algebraic signature for the row parity block and the second result matches the diagonal parity algebraic signature for the diagonal parity block.

* * * * *